United States Patent
Sorkin (10) Patent No.: US 9,829,136 B1
(45) Date of Patent: Nov. 28, 2017

(54) MATCHCAST COUPLER RING FOR SEGMENTAL CONSTRUCTION

(76) Inventor: Felix L. Sorkin, Stafford, TX (US)

( * ) Notice: Subject to any disclaimer, the term of this patent is extended or adjusted under 35 U.S.C. 154(b) by 1422 days.

(21) Appl. No.: 12/552,164

(22) Filed: Sep. 1, 2009

(51) Int. Cl.
*F16L 37/248* (2006.01)

(52) U.S. Cl.
CPC .................................. *F16L 37/248* (2013.01)

(58) Field of Classification Search
USPC ....... 285/223, 226, 227, 229, 230, 231, 237, 285/363; 52/220.1–8, 223.1–14, 250, 52/740.1
See application file for complete search history.

(56) References Cited

U.S. PATENT DOCUMENTS

| | | | |
|---|---|---|---|
| 727,858 A * | 5/1903 | Stier | 285/148.14 |
| 4,856,581 A * | 8/1989 | Santoro | 165/130 |
| 5,231,931 A | 8/1993 | Sauvageot | |
| 6,764,105 B1 | 7/2004 | Sorkin | |
| 6,834,890 B2 | 12/2004 | Sorkin | |
| 6,874,821 B1 | 4/2005 | Sorkin | |

OTHER PUBLICATIONS

U.S. Appl. No. 11/861,166, filed Sep. 25, 2007, Sorkin, Felix L.

* cited by examiner

*Primary Examiner* — David E Bochna
(74) *Attorney, Agent, or Firm* — Egbert Law Offices, PLLC (57) ABSTRACT

An article for connecting couplers during formation of matchcast concrete segments with an annular member with an outer surface, a first edge and a second edge opposite the first edge. A first slot formed in the outer surface opens to the first edge and extends angularly inwardly therefrom. A second slot is formed in the outer surface in spaced relation to the first slot and opens to the second edge and extends angularly inwardly therefrom. The first slot has a rectangular portion with a side opening to the first side of the annular member and a groove extending angularly from an opposite side of the rectangular portion. The second slot has a rectangular portion with a side opening to the second side of the annular member and a groove extending angularly from an opposite side of the rectangular portion.

7 Claims, 7 Drawing Sheets

MATCHCAST COUPLER RING FOR SEGMENTAL CONSTRUCTION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the assembly and installation of precast concrete segments used in construction of concrete structures, such as bridge and highway construction. Particularly, the present invention relates to couplers for joining the ends of interior ducts of such precast concrete segments in end-to-end liquid-tight relationship. More particularly, the present invention relates to rings for connecting couplers in matchcast construction.

2. Description of Related Art Including Information Disclosed Under 37 CFR 1.97 and 37 CFR 1.98

Precast segmental bridges are known and commonly used throughout the world as a means to forge roadways through mountainous terrain or across rivers or other barriers. Such bridges are typically constructed in accordance with the following sequence: First, a series of upright piers are formed along the bridge span. Thereafter, cantilevered bridge sections are built out of each pier by successively mounting the precast segments to previously completed bridge components and post-tensioning the segments thereto. The cantilevered bridge sections are built out from each pier in a symmetrical fashion so that the piers are not subjected to undue bending loads. When the cantilevered sections are complete, the ends thereof are post-tensioned together to form a continuous bridge deck. Typically, two such bridge spans are constructed to accommodate the two directions of travel. These spans are generally side-by-side, but need not be parallel (horizontally or vertically) nor at the same elevation.

FIGS. 1-4 illustrate a form of such precast segmental bridge construction in accordance with the teachings of U.S. Pat. No. 5,231,931, issued on Aug. 3, 1993 to G. Sauvagiot. This form of segmental precast bridge construction is particularly disclosed as used with a rapid transit viaduct system.

Figure 1:
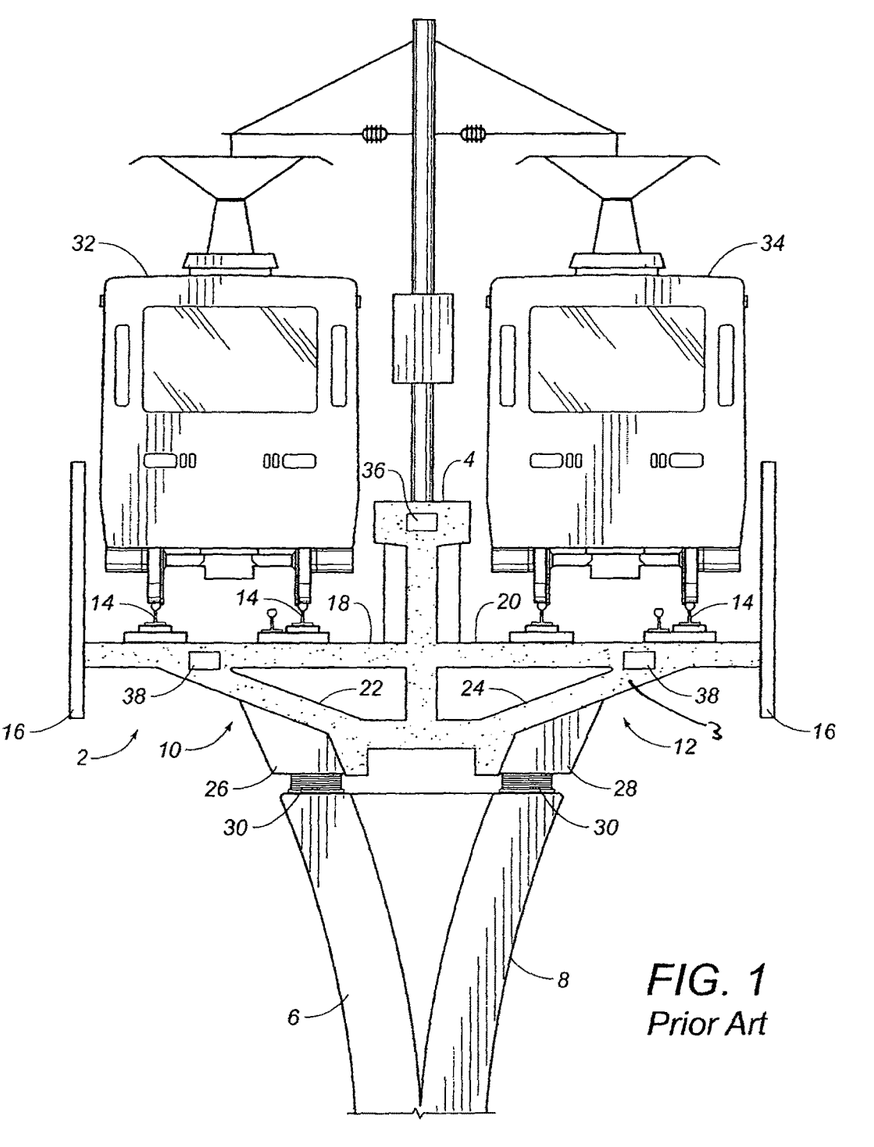
FIG. 1 shows an end elevational view of a prior art concrete section of a rapid transit viaduct system, with the concrete section being a concrete segment of a segmental concrete structure.

Referring to FIG. 1, there is shown an end view of a rapid transit viaduct section 2 with rapid transit vehicles 32 and 34 thereon. The section 2 includes a concrete segment 3. The section 2 has a central load-bearing member, or body member 4, supported by a pair of upright pier members 6 and 8. Extending laterally from opposite lower side portions of the body member 4 are a pair of lateral platform structures 10 and 12. Each of the platform structures 10 and 12 has a pair of rails 14 mounted thereon for carrying a rapid transit vehicle 32 and 34. In addition, each of the platform structures 10 and 12 can have an upright sidewall section 16 as required for safety, noise pollution, and other considerations. One or more sets of rails 14 are carried by each of the lateral platform structures depending on the requirements of the transit systems.

The platform structures 10 and 12 each include respective upper platform decks and respective lower support struts 22 and 24. The lower support struts 22 and 24 are mounted as close to the bottom of the body member 4 as practicable. Deck members 18 and 20 are mounted to the body member 4 at an intermediate portion thereof above the support struts 22 and 24. The support struts 22 and 24 angle upwardly from their point of attachment with the body member 4 until they intersect the deck members 18 and 20. As such, the deck members 18 and 20 and support struts 22 and 24 form a box section providing resistance to torsional loading caused by track curvature and differential train loading. This box section may be considered a closed base. The body member 4 bisects the closed base and extends vertically upwardly therefrom to provide span-wise bending resistance. Preferably, the entire duct section 2 is cast as a single reinforced concrete cross-section.

The platform structures 10 and 12 each include lower pier mounts 26 and 28. These are mounted respectively to the bottom of the support structures 22 and 24. The pier mounts 26 and 28 are, in turn, supported, respectively, on the piers 6 and 8 using a plurality of neoprene pads 30, which provide a cushioned support for the structure.

The viaduct section 2 shown in FIG. 1 forms part of a viaduct system supporting rails 14 for carrying rapid transit vehicles 32 and 34. The viaduct section 2 may be formed as a precast modular segment 3. The viaduct section 2 is then combined with other viaduct sections to form a precast segmental structure. To facilitate such construction, the body member 4 may be formed with interlock member 36, while the lateral platform structures 10 and 12 may be each formed with interlock members 38.

Figures 2, 3, 4:
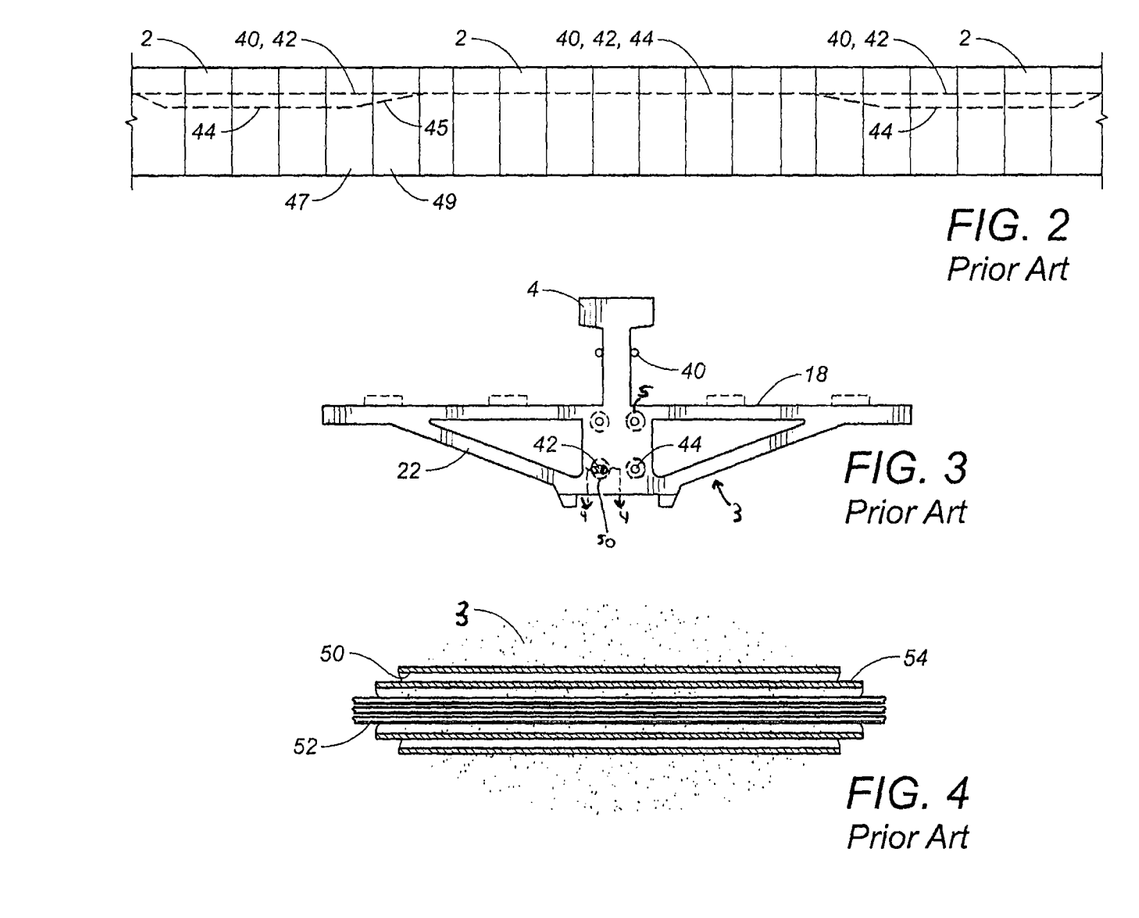
FIG. 2 shows a plan view of a viaduct system formed from precast sections.
FIG. 3 is an end view of a precast concrete segment used in segmental construction of a rapid transit system.
FIG. 4 shows a cross-sectional view of a tunnel formed in the concrete segment, taken along sight line 4-4 of FIG. 3.

Referring to FIG. 2, there is shown a plan view of a viaduct system formed from precast sections 2. The sections 2 are modular concrete segments that are combined to form a precast segmental structure extending between sequentially positioned piers (not shown). The sections 2 are placed in longitudinally-abutting relationship. To facilitate that construction, the sections are match cast so that the abutting end portions thereof fit one another in an intimate interlocking relationship. Each successive section is therefor cast against a previously cast adjacent section to assure interface continuity.

The connection between adjacent modular sections 2 is further secured by way of the interlock members 36 and 38. On one end of each section 2, the interlock members 36 and 38 are formed as external key members. On the opposite end of each section 2, the interlock members are formed as an internal slot or notch, corresponding to the key members of the adjacent viaduct system. Matchcasting assures that corresponding key members and slots, as well as the remaining interface surfaces, properly fit one another.

As seen in FIG. 2, the sections 2 are bound together with one or more post-tensioning cables or tendons 40, 42 and 44. The number of cables used will depend on a number of factors such as cable thickness, span length, and loading requirements. The tensioning cables are each routed along a predetermined path which varies in vertical or lateral position along the span of the segmental structure.

Referring to FIG. 3, there is shown an end view of a concrete segment 3 used in segmental construction of a rapid transit system. Adjacent segments are held together by post-tensioning cables 42 and 44 that extend through the concrete segment 3. As can be seen in FIG. 3, post-tensioning cables 40 are positioned externally of the concrete segment 3, and post-tensioning cables 42 and 44 are positioned internally of the concrete segment 3. Cables 42 and 44 extend through tunnels 50 formed in the concrete segment 3. It is important to note that multiple post-tension cables 42 can extend through a single tunnel 50 formed within the concrete segment 3.

Referring to FIG. 4, there is shown a cross-section view of the tunnel 50 formed in concrete segment 3, taken along sight line 4-4 of FIG. 3. Post-tensioning cables 52 are routed through the tunnel 50. To facilitate this routing, a continuous flexible duct 54 is initially inserted through the tunnel 50, and the post-tensioning cables 52 are thereafter placed in the duct 54. The duct 54 may advantageously be formed from polyethylene but could also be formed from other flexible materials. The post-tensioning cables 52 are tensioned using a conventional post-tensioning apparatus and the interior of the duct 54 is cement-grouted along the entire length thereof for corrosion protection of the cables 52.

Figure 5:
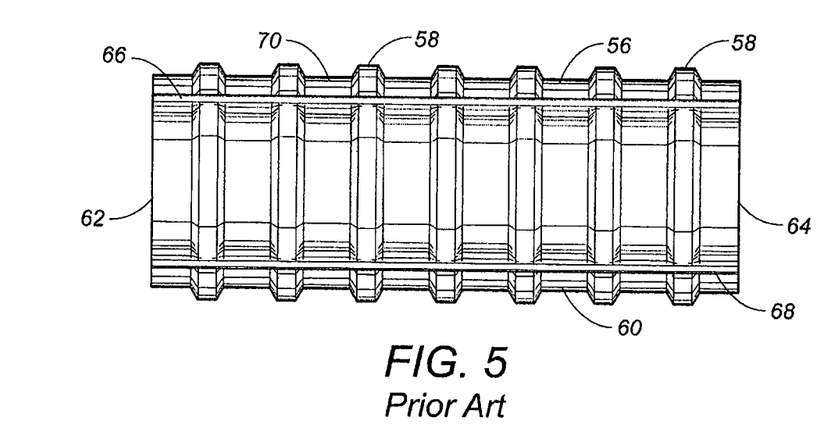
FIG. 5 shows a plan view of a prior art multi-cable duct.

One form of duct that is commercially available is shown in FIG. 5. The corrugated polymeric duct 56 is of a type presently manufactured by General Technologies, Inc. of Stafford, Tex., licensee of the present inventor. As can be see in FIG. 5, duct 56 has a plurality of corrugations 58 extending radially outwardly from the generally tubular body 60. The duct 56 has ends 62 and 64 through which post-tensioning cables can emerge. In FIG. 5, it can be seen that there are longitudinal channels 66, 68 and 70 extending along the outer surface of the tubular body 60. The longitudinal channels 66, 68 and 70 allow any grout that is introduced into the interior of the duct 56 to flow easily and fully through the interior of the duct 56. The longitudinal channels 66, 68 and 70 also add structural integrity to the length of the duct 56. It is important to realize that the duct 56 can be formed of a suitable length so as to extend fully through one of the sections 2 as used in a precast segmental structure.

Unfortunately, when such ducts, such as duct 56, are used in such precast segmental construction, it is difficult to seal the ends 62 and 64 of each duct to the corresponding duct of an adjacent section of the segmental structure. Conventionally, the segments are joined together in end-to-end relationship through the application of an epoxy material to the matching surfaces of the structure. Under such circumstances, it is very common for the epoxy to flow or to become extruded into the opening at the ends 62 and 64 of the duct when the segments are connected in end-to-end relationship. In other circumstances, a grout is pumped through the interior passageway of the duct 56 so as to offer a seal against the intrusion of air and water into the interior of the duct 56. Grout is pumped through the interior of the ducts. Unfortunately, if there is an incomplete connection between the duct 56 of one segment and the duct of an adjoining segment of the segmental structure, then the epoxy will leak out into the interface area between the segments and will not flow fully through the entire duct assembly. Once again, an incomplete grouting of the interior of the duct 56 may occur and make the cables 52 prone to corrosion.

It is important to note that in such precast concrete segmental construction, the concrete will slightly warp when matched with the adjoining section. Even though match casting is employed, the lack of homogeneity in the concrete mixtures used for the adjoining sections can cause a misalignment between matching sections. A great deal of tolerance must be maintained when a coupler is developed so that any warping or distortion in the surfaces of the matching segments can be accommodated.

The ability to avoid air and liquid intrusion into the interior of the duct 56 is very important in such multi-strand, precast concrete segmental structures. As can be seen in FIG. 1, because the structure is often used on bridges or elevated structures, the post-tensioning cables can be subject to a great deal of exposure from the elements. For example, if the bridge structure is associated with roads traveled by motor vehicles, then there is often the application of salt onto the highway. This salt, when dissolved in water, can leach through the area between the structure segments into the ducts and deteriorate the post-tensioning cables over time. As the post-tensioning cables become corroded, over time, they can weaken so as to potentially cause the failure of the segmental structure. Past experience with such structures has shown that the primary area of leakage is through cracks formed between adjoining concrete segments. As such, it is particularly important to provide a coupler for use in association with the plastic ducts which will effectively prevent any liquid intrusion from entering the area interior of the ducts and adjacent to the post-tensioning cables.

The present inventor is the owner of several patents relating to duct couplers for use with precast concrete segmental construction. In particular, U.S. Pat. No. 6,764,105, issued on Jul. 20, 2004, discloses a coupler member for use with precast concrete segmental structures. The structure is illustrated in FIGS. 6 and 7 herein.

Figure 6:
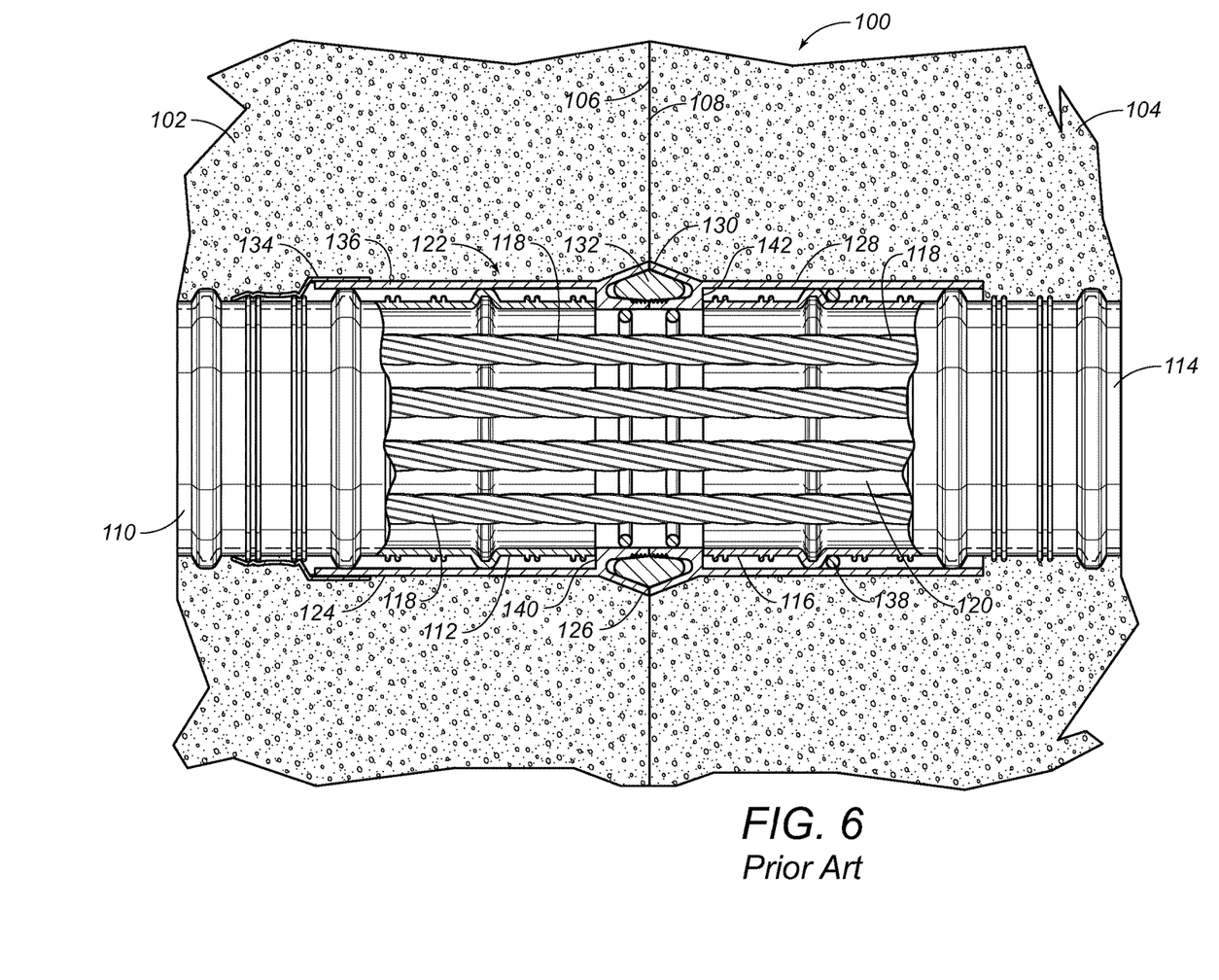
FIG. 6 is a partial cross-sectional view of a prior art duct, showing a coupler assembly as used in a precast concrete segmental structure of the prior art, after cables are inserted and grout is filled within the interior of the duct.
Figure 7:
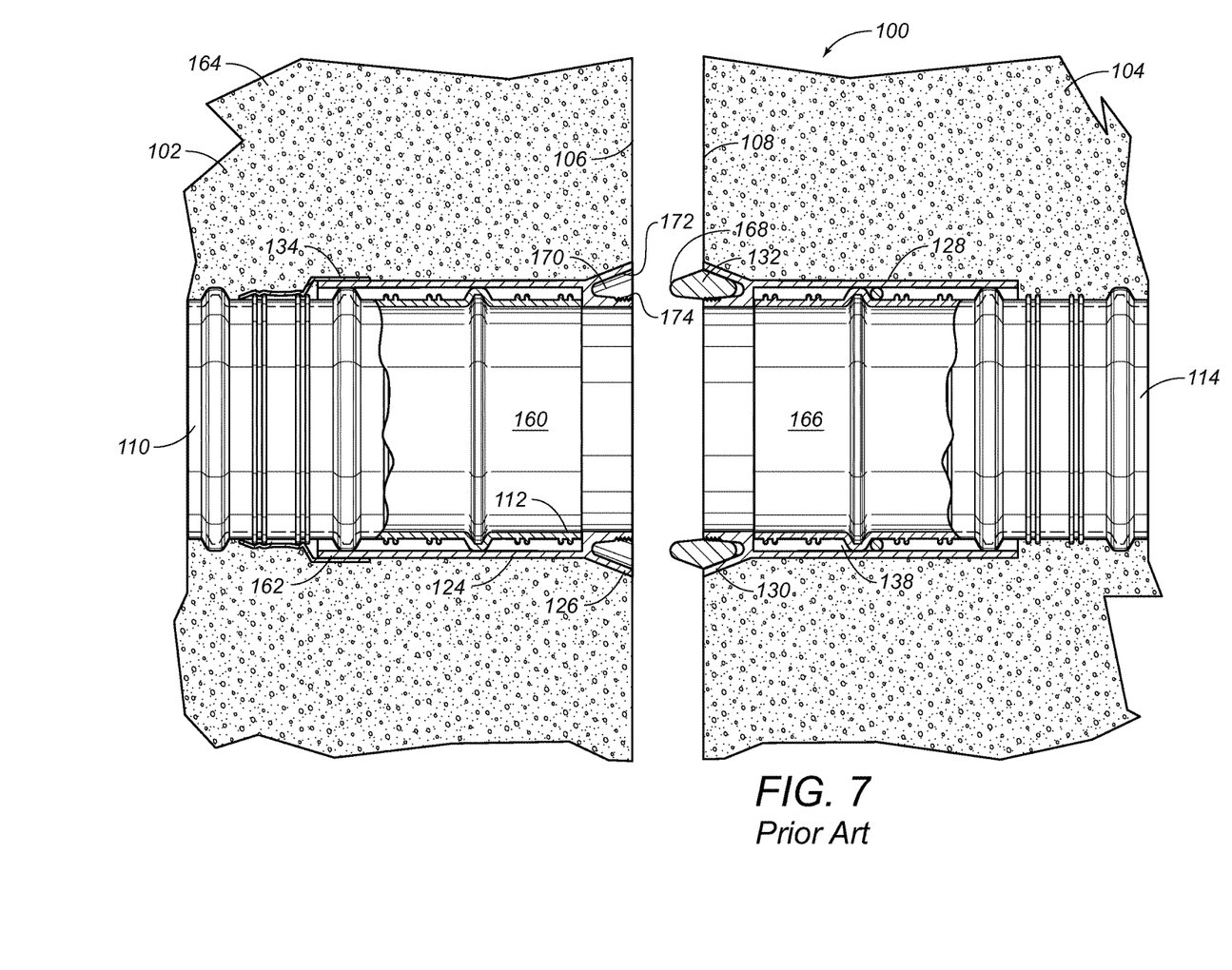
FIG. 7 is a partial cross-sectional view showing the assembly of the coupler apparatus of the prior art of FIG. 6, before cables are inserted and grout is filled within the interior of the duct.

Referring to FIG. 6, there is shown the precast concrete segmental structure 100. The structure 100 includes a first concrete segment 102 and a second concrete segment 104. The first concrete segment 102 has an outer surface 106 which is joined in surface-to surface contact with the inner surface 108 of the concrete segment 104. The segments 102 and 104 are formed by match casting, as described hereinbefore.

Importantly, a first duct 110 is embedded in the first concrete structure 102. Duct 110 has a construction similar to that shown in FIG. 5, or similar to other multi-cable ducts. The first duct 110 has an end 112 generally adjacent to the exterior surface 106 of the concrete segment 102. Similarly, a second duct 114 is embedded in the second concrete segment 104. The second duct 114 has a configuration similar to that of duct 110. Duct 114 has an end 116 generally adjacent to the inner surface 108 of concrete segment 104. Each of the ducts 110 and 114 are embedded in the respective concrete segments 102 and 104 so as to be generally longitudinally aligned. The duct 110 has an interior passageway which will be axially aligned with the interior passageway of duct 114.

As can be seen in FIG. 6, a plurality of tendons 118 extend longitudinally through the interior passageways of the ducts 110 and 114. In FIG. 6, these tendons 118 are properly post-tensioned in a conventional manner. A grouting material 120 is introduced through the interior passageways 110 and 114 to further cement and seal the interior of the ducts 110 and 114 around the tendons 118. The grouting material, in combination with the polymeric material of the ducts 110 and 114, serves to avoid the adverse effects of liquid intrusion into the tendons 118.

A unique coupler apparatus 122 further assures the avoidance of liquid intrusion through the space between the exterior surface 106 of concrete segment 102 and the inner surface 108 of concrete segment 104. A first coupler member 124 extends over and around the exterior surface of the first duct 110. The first coupler member 124 has an end 126 opening at the exterior surface 106 of concrete segment 102. Similarly, the end 126 of the coupler member 124 is generally forward of, but adjacent to, the end 112 of first duct 110. A second coupler member 128 extends over and around the exterior surface of the second duct 114. The second coupler member 128 has an end 130 opening at the inner surface 108 of concrete segment 104. End 130 is slightly forward of the end 116 of the duct 114. A gasket 132 is received in the ends 126 and 130 of the respective coupler members 124 and 128. The gasket 132 is particularly designed to prevent liquid from passing between the ends 126 and 130 of the respective coupler members 124 and 128 into the interior of the ducts 110 and 114. The coupler members 124 and 128 have an identical configuration to each other. This serves to minimize the manufacturing requirements since only a single mold is required for each of the coupler members. Also, installation is easy since unskilled workers can install the first and second coupler members without regard to the configuration of a particular coupler member.

An external seal 134 is affixed in generally liquid-tight relationship to an opposite end 136 of the first coupler member 124 and is also affixed to an exterior surface of the first duct 110. In particular, the external seal 134 is formed of an elastomeric sleeve or an annular heat shrink material. The external seal 134 will be in compressive liquid-tight contact with the exterior surface of the first coupler member 124 and with the exterior surface of the duct 110. Prior to embedding the coupler member 124 into the concrete associated with the concrete segment 102, the coupler member 124 can be affixed in liquid-tight relationship by applying heat to the exterior surface of the external seal 134. As a result, the heat-shrink material of the external seal 134 will tightly engage the surfaces of the coupler member 124 and also the exterior surfaces of the duct 110. As a result, the external seal 134 will prevent liquid intrusion through the opposite end 136 of the coupler member 124.

An internal seal 138 is interposed in generally liquid-tight relationship between the interior surface of the second coupler member 128 and the exterior surface of the second duct 114. This internal seal 138 is a generally annular ring formed of an elastomeric material. The internal seal 138 is positioned to allow relative movement between the second coupler member 128 and the second duct 114 while maintaining the liquid-tight relationship between the coupler member 128 and the duct 114. The ability to allow relative movement between the coupler member 128 and the duct 114 is important because of the "match casting" used for the formation of the second concrete segment 104. If there is any warping or inconsistent relationship between the surfaces 106 and 108, the second coupler member 128 will be able to relatively move with respect to the exterior surfaces of the duct 114 to adjust for such warping or inconsistencies. The second coupler member 128 is also movable in relation to any expansion or contraction of the concrete segments 102 and 104. This can be done without affecting the liquid-tight environment between the coupler member 128 and the duct 114.

In FIG. 6, it can be seen that the end 126 of the first coupler member 124 has a generally V-shaped groove facing the second coupler member 128. In particular, it is the opening of this V-shaped groove which faces the second coupler member 128. Similarly, the end 130 of the second coupler member 128 is a V-shaped groove which faces the V-shaped groove of the end 126. It can be seen that the gasket 132 is fitted into the V-shaped groove at one of the ends 126 and 130 or into both of the ends 126 and 130.

So as to further assure the avoidance of any liquid intrusion, it can be seen that the end 126 of the first coupler member 124 has a surface 140 which is in abutment with the end 112 of the first duct 110. Similarly, the, second coupler member 128 has a surface 142 which is in abutment with the end 116 of the second duct 114. This relationship further assures the accurate placement of the coupler members in end-to-end relationship and further assures the alignment of the ducts 110 and 114.

As can be seen in FIG. 6, the gasket 132 is an elastomeric ring having a cross-sectional thickness greater than a depth of either of the V-shaped grooves of the respective ends 126 and 130 of the coupler members 124 and 128. As a result, the elastomeric ring of the gasket 132 will effectively "fill" the outer portions of the V-shaped grooves. The configuration of the V-shaped grooves causes the elastomeric material of the gasket 132 to "extrude" thereinto so as to establish a tight sealing relationship therewith.

The first duct 110, the second duct 114, the first coupler member 124 and the second coupler member 128 are formed of a polymeric material. Each of these components can be formed in an injection molding process. Similarly, the gasket 132 can be formed of an elastomeric or other resilient material. The material used for the gasket 132 should be suitably hydrophobic so as to resist any liquid intrusion.

Referring to FIG. 7, there is shown a cross-sectional view of the duct 100 prior to the installation of the tendons 118 and the installation of the grout 120. The first duct 110 is suitably mounted against a metal bulkhead having a flat surface corresponding to the formation of the exterior surface 106 of concrete segment 102. A suitable fixture is provided on the metal bulkhead which will extend into the interior 160 of the first duct 110. Prior to the installation of the first duct 110 onto the bulkhead fixture, the coupler member 124 is placed over the exterior surface of the first duct 110. Similarly, the external seal 134 is placed over the end 162 of the coupler member 124 opposite the end 126. A suitable heating device, such as a hot air blower, can be applied to the external seal 134 so as to heat shrink the seal 134 upon the exterior surface of the duct 110 and upon the exterior surface of the first coupler member 124. Once the duct 110, along with the attached coupler member 124, is placed upon the bulkhead fixture, the concrete 164 can then be poured into a suitable mold. After solidifying, the metal bulkhead and the attached bulkhead fixture are removed from the surface 106 so as to create a flat surface thereagainst. Upon solidification, the inner surface 108 of the concrete segment 104 will be formed by match casting. In other words, the surface 106 will act as a surface for the formation of surface 108. A suitable mandrel or alignment plug can be placed into the interior passageway 160 of the first duct 110. This alignment plug can extend outwardly beyond the surface 106. The second coupler member 128 can then be applied onto the exterior surface of the second duct 114. The internal seal 138 is interposed between the inner surface of the second coupler member 128 and the exterior surface of the duct 114. The second duct 114 and its associated coupler 128 can then be placed over the alignment plug extending outwardly of the interior passageway 160 of the duct 110 so as to extend into the interior passageway 166 of the second duct 114. Because there is a possibility of slight misalignment during the formation of the second concrete segment 104, the second coupler member 128 is slidable relative to the duct 114 by virtue of the "rollability" of the internal seal 138.

After the concrete solidifies, the surface 108 will be separated from surface 106. Similarly, the end 130 of the coupler member 128 will be separated from the end 126 of the coupler 124. The gasket 132 can then be installed into the V-shaped groove associated with the end 130 of the second coupler 128. Because of the enlarged cross-sectional area of the annular gasket 132, a portion of the gasket 132 will extend outwardly beyond the end 130 of the second coupler member 128.

The segment 102 can then be installed as part of the segmental structure. The segment 104 is then transported into position so that the surface 108 will face the surface 106. Because it is possible that a misalignment of the surface of the segments can occur, the particular arrangement of the V-shaped grooves and the shape of the gasket 132 will accommodate any misalignment. When the surface 108 is brought into proximity against the surface 106, the relatively pointed side 168 of the gasket 132 will "funnel" into the V-shaped groove 170 at the end 126 of the first coupler member 124. Particularly, the pointed side 168 may contact either of the sides 172 or 174 of the V-shaped groove 170. As the surface 108 is brought further into proximity with surface 106, the gasket 132 will extrude into the V-shaped groove 170 so as to establish an effective liquid-tight seal therewith. After assembling and epoxying of the surfaces 106 and 108 together, tendons can be extended through the interior passageways 160 and 166 of the respective ducts 110 and 114 so as to permanently join the segments 102 and 104 in post-tensioned relationship.

Importantly, as can be seen in FIG. 6, the use of the unique configuration of the gasket 132, along with V-shaped groove 170, will avoid any intrusion of epoxy into the interior passageways 160 and 166. The gasket 132 will block the extruded epoxy from flowing in an undesired manner into the interior passageways 160 and 166. In a similar manner, the gasket 132 will also prevent any liquid intrusion from passing into these interior passageways. The compressive relationship between the V-shaped grooves associated with the coupler members 124 and 128 establishes a strong sealing bond between the coupler members which will be resistive to the elements over an extended period of time. Subsequent to installation, the grout can be effectively pumped through the interior passageways 160 and 166 without any grout accidentally flowing outwardly of the ducts 110 and 114 in the area of the space between the segments 102 and 104. Secondary liquid intrusion is effectively accomplished through the tight sealing relationship of the external seal 134 and the sliding sealing of the internal seal 138.

U.S. Pat. Nos. 6,764,105, 6,834,890 and 6,874,821 show variations on this prior invention. In particular, U.S. Pat. No. 6,764,105, issued on Jul. 20, 2004 to the present inventor, discloses a coupler member for use with precast concrete segmental structures. This coupler member has a first duct, a first coupler member extending over and around an exterior surface of the first duct and having a seat opening adjacent an end of the first duct, a second duct, and a second coupler member extending over and around an exterior surface of the second duct and having a seat opening adjacent to an end of the second duct. A gasket is received in the seats of the first and second coupler members. An external seal is affixed to an opposite end of the first coupler member and affixed to an exterior surface of the first duct. The seats of the first and second coupler members have slots facing one another. The gasket is received within these slots. The gasket has a tapered outer surface suitable for liquid-tight abutment against an inner surface of one of the slots.

U.S. Pat. No. 6,834,890, issued on Dec. 28, 2004 to the present inventor, describes another coupler apparatus for use with tendon-receiving ducts in a segmental precast concrete structure. This coupler apparatus includes a coupler body having an interior passageway for receiving the duct therein. The coupler body has a generally U-shaped channel formed at one end thereof. The coupler element has a connector element formed on interior thereof adjacent one end of the coupler body so as to allow the coupler element to receive a variety of implements for the formation of the precast concrete segment.

One of the problems associated with these prior art patents is that each of these prior art patents is particularly designed where the tendons are maintained in generally longitudinal alignment. However, in precast concrete construction, the edges of the concrete segments will be aligned with each other while the ducts extend at an angle with respect to these edges. As such, it is necessary for the coupler apparatus to be able to accommodate the angled relationship of the ducts. Because each of the coupler segments must open at an end of the concrete structure and be joined together at such end, the coupler apparatus must be able to accommodate the fact that the ducts extend at an angle with respect to these ends. As such, U.S. Pat. No. 6,874,821, issued on Apr. 5, 2005 to the present inventor, was designed to accommodate this angled relationship of the ducts. This patent describes a coupler apparatus for use with precast concrete segmental construction. The coupler apparatus has a first duct, a first coupler member extending over and around the first duct, a second duct, a second coupler member extending over and around the second duct, and a gasket received at the ends of the first and second coupler members so as to prevent liquid from passing between the coupler members into an interior of either of the ducts. The ducts extend at a non-transverse acute angle with respect to the ends of the coupler members. Heat shrink seals are affixed to the opposite ends of the coupler members so as to secure the coupler members to the ducts in liquid-tight relationship. The ends of the coupler members have generally V-shaped grooves facing each other. The gasket is received in compressive relationship within the V-shaped grooves.

Although the device shown in U.S. Pat. No. 6,874,821 is effective for connecting angled post-tension cables in precast concrete segmental construction, it is believed important to be able to flexibly arrange the positioning of the ducts with respect to the coupler members. As such, a need developed so as to provide a structure whereby the angled relationship of the ducts can be easily and effectively achieved through the use of standard coupler constructions.

U.S. patent application Ser. No. 11/861,166, filed on Sep. 25, 2007 by the present inventor discloses a coupler apparatus for use with concrete segments has a first duct, a first coupler member having a connector and a flexible boot extending therefrom and having an end extending over a surface of said first duct, a second duct, a second coupler member having a connector and a flexible boot extending therefrom and extending over an exterior surface of the second duct, and a gasket received in the connectors of the first and second coupler members for forming a liquid-tight seal between the first and second ducts. Clamps are affixed over the ends of the flexible boot so as to establish a liquid-tight seal with the respective ducts. The connector includes an annular section affixed to an end of the flexible boot and an annular groove formed around this annular section.

When pouring matchcast segments, it is important to align the ducts and associated couplers. The duct and associated coupler in the segment being poured must be fixed in an aligned position in a manner so as to withstand forces imparted by the poured concrete. If the duct couplers are not aligned properly, it can be difficult or impossible to properly connect the various segments in the field. In the prior art, various apparatus are used to connect the duct couplers prior to and during the concrete pour. One method involves inserting a dowel rod into the couplers in the matchcast pour, however this method is not reliable and the couplers can become dislodged from the dowel. Therefore, a need has arisen to provide an apparatus which can easily and effectively connect the various couplers used in matchcast construction.

It is an object of the present invention to provide a coupler ring apparatus which allows for the coupling of multi-tendon ducts in precast segmental concrete structures.

It is another object of the present invention to provide a coupler ring apparatus which allows for positioning of adjacent couplers in a matchcasting pour.

It is another object of the present invention to provide a coupler ring apparatus which connects the several couplers of adjacent precast concrete structures.

It is yet another object of the present invention to provide a coupler ring apparatus which assures a seal between adjacent couplers.

It is still another object of the present invention to provide a coupler ring apparatus which is easy to install, easy to use, and easy to manufacture.

It is another object of the present invention to provide a coupler ring apparatus which effectively prevents the intrusion of an epoxy into the interior of the duct during the sealing of one structural segment to another structural segment.

These and other objects and advantages of the present invention will become apparent from a reading of the attached specification and appended claims.

BRIEF SUMMARY OF THE INVENTION

The present invention is an article for connecting couplers during formation of matchcast concrete segments. The article has an annular member with an outer edge and a first edge and a second edge opposite the first edge. The annular member has a first slot formed in the outer surface which opens to the first edge and extends angularly inwardly therefrom. The annular member also has a second slot formed in the outer surface in spaced relation to the first slot. The second slot opens to the second edge and extends angularly inwardly therefrom. The first slot is in generally parallel relation to the second slot. The first slot and second slots include a plurality of slots formed in circumferentially spaced relation around the annular member. The first slot has a rectangular portion with a side opening to the first side of the annular member with a groove extending angularly from an opposite side of the rectangular portion. The second slot has a rectangular portion with a side opening to the second side of the annular member with a groove extending angularly from an opposite side of the rectangular portion. The groove extends for less than the circumference of the annular member and has a depth of approximately twenty percent of the thickness of the annular member. The annular member has an inner surface opposite the outer surface and has a tongue extending inwardly from the inner surface of the annular member.

The present invention is also a coupling system for use in a formation of matchcast concrete segments. The system has a first duct, a first coupler affixed to the first duct with an opening at one end thereof and a pin member extending inwardly from the opening, a second duct, a second coupler affixed to the second duct with an opening at one end thereof and a pin member extending inwardly from the opening, and an annular member with an outer surface and first edge and a second edge. The annular member has a first slot formed in the outer surface and a second slot formed in the outer surface. The pin member of the first coupler is received in the first slot and the pin member of the second coupler is received in the second slot.

In the coupling system of the present invention, the first slot opens to the first edge of the annular member and has a portion extending angularly inwardly therefrom. The pin member of the first coupler is received in the portion of the first slot. The second slot opens to the second edge of the annular member and has a portion extending angularly inwardly therefrom. The pin member of the second coupler is received in the portion of the second slot. The pin member of the second coupler is releasably received in the portion of the second slot. The first slot has a rectangular portion with a side opening to the first edge of the annular member and the portion of the first slot is a groove extending angularly inwardly from an opposite edge of the rectangular portion. The second slot has a rectangular portion with a side opening to the second edge of the annular member and the portion of the second slot is a groove extending angularly inwardly from an opposite side of the rectangular portion thereof.

In the system of the present invention, the first slot includes a plurality of slots formed in the annular member and the second slot includes a plurality of slots formed in the annular member. The pin member of the first coupler includes a plurality of pin members respectively received by the plurality of slots of the first slot. The pin member of the second coupler includes a plurality of pin members respectively received by the plurality of slots of the second slot. The opening of the first coupler is in surface-to-surface relation with the outer surface of the annular member and the opening of the second coupler is in surface-to-surface relation with the outer surface of the annular member. The annular member has an inner surface opposite the outer surface thereof and a tongue extending inwardly from the inner surface thereof. The tongue extends around the inner diameter of the annular member.

The system of the present invention further includes a first concrete segment with an end wall and a second concrete segment with an end wall. The first coupler has an opening at the end wall of the first concrete segment and extends therethrough. The second coupler has an opening at the end wall of the second concrete segment and extends therethrough.

DETAILED DESCRIPTION OF THE INVENTION

Figure 8:
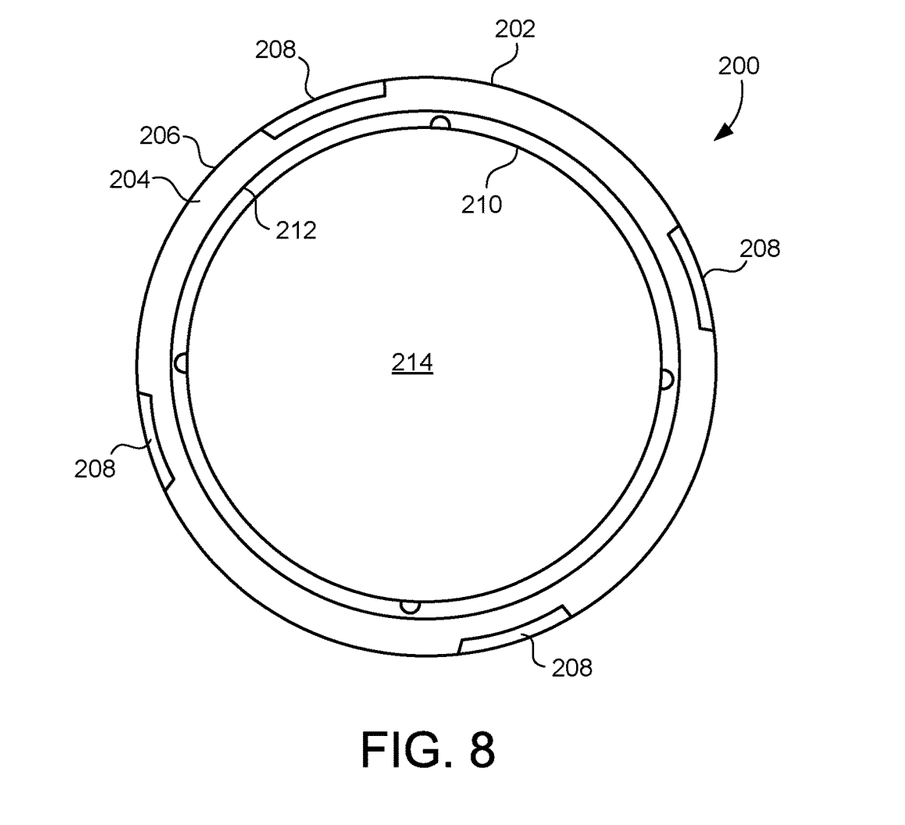
FIG. 8 is a plan view of the coupler ring apparatus of the present invention.

Referring to FIG. 8, there is shown the coupler ring apparatus 200 in accordance with the teachings of the present invention. The coupler ring 200 is an article for connecting couplers in matchcast construction. The coupler ring apparatus 200 has an outer surface 202, which is generally flat. The coupler ring apparatus 200 is an annular member and has a first edge 204 shown in FIG. 8, and a second edge 206 opposite the first edge 204. The second edge 206 is not shown in FIG. 8. Circumferentially spaced along the circumference of the coupler ring apparatus 200 are shown the plurality of slots 208. The plurality of slots 208 are formed within the outer surface 202 of the coupler ring apparatus 200. The plurality of slots 208 define openings in the first edge 204. The slots 208 have a relatively small depth, with the depths of the slots 208 being approximately twenty percent of the total depth of the coupler ring apparatus 200.

Additionally, the coupler ring apparatus 200 includes a tongue 210 which extends inwardly from the inner surface 212 of the coupler ring apparatus 200. The width of the coupler ring apparatus 200 is substantially greater than the width of the tongue 210. The tongue 210 has a generally curved inner surface. Preferably, the cross section of the tongue 210 is semicircular. An opening 214, extends through the coupler ring apparatus 200, which accommodates a pipe or bladder which is shown in later figures. The coupler ring apparatus 200 is formed integrally of a durable polymeric material.

Figure 9:
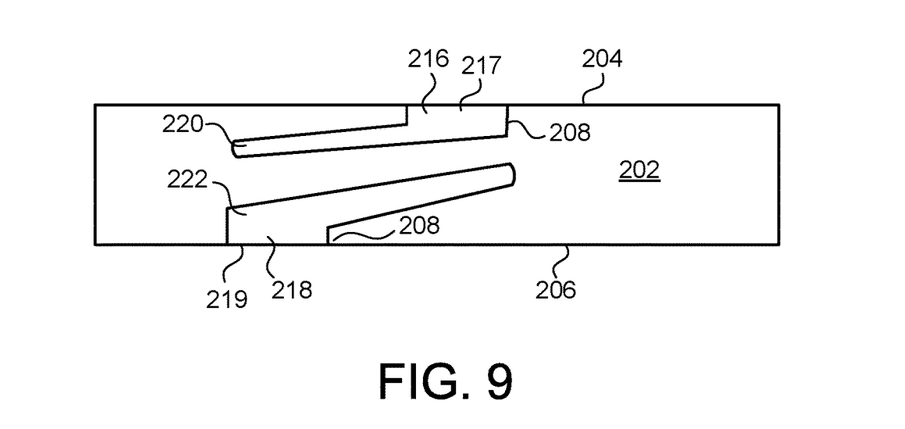
FIG. 9 is a profile view of the coupler ring apparatus of the present invention.

Referring to FIG. 9, there is shown a side view of the coupler ring apparatus 200 of the present invention. Importantly, in FIG. 9 the configuration of the plurality of slots 208 can be seen. An upper slot 216 is in communication with the first edge 204 of the coupler ring apparatus 200. A lower slot 218 is in communication with the second edge 206 of the coupler ring apparatus 200. The upper slot 216 includes a generally rectangular slot 217, and a groove 220 extending diagonally downwardly therefrom. The groove 220 extends toward the second edge 206 of the coupler ring apparatus 200. The lower slot 218 opposes the upper slot 216 and similarly includes the groove 222 which is communication with the rectangular slot 219. Similarly, the groove 222 extends diagonally upwardly from rectangular slot 219 towards the first edge 204. The slots and grooves 216, 218, 220 and 222 are formed within the outer surface 202 of the coupler ring apparatus 200. At each location in FIG. 9 where a slot 208 is shown, an upper slot 216 and an opposing lower slot 218 will be present.

Figure 10:
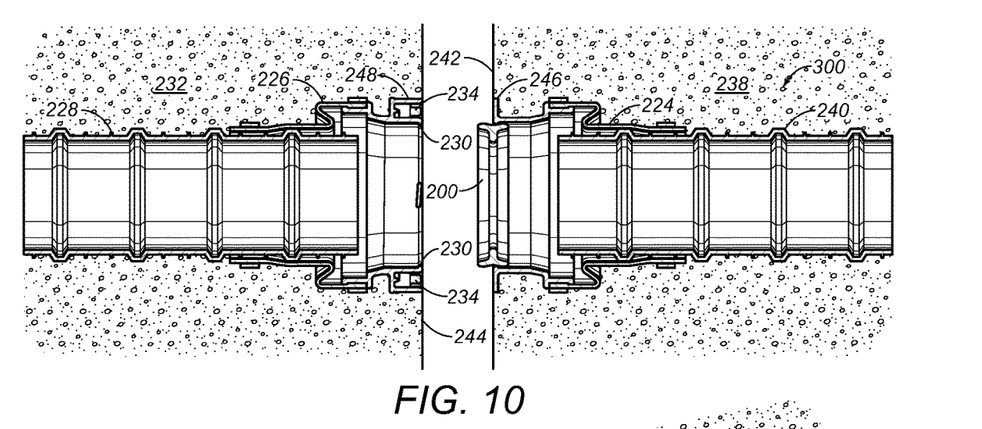
FIG. 10 shows a cross-sectional view of the coupler ring apparatus of the present invention installed in a matchcast assembly where the coupler ring apparatus fixedly positions the coupler in a structure to be poured.

Referring to FIG. 10, there is shown the coupling system 300 utilizing the coupler ring apparatus 200 of the present invention. In coupling system 300 of the present invention there is a first precast segment 238. The first precast segment 238 is set in concrete, and includes the first duct 240. The first duct 240 is connected to a first coupler assembly 224. The first coupler assembly 224 terminates at the face 242 of the first precast segment 238. The first coupler assembly 224 has means for connecting the first duct 240. As shown in FIG. 10, the first duct 240 is at an angle extending diagonally upwardly from the longitudinal axis of the second duct 228. Alternatively, the first duct 240 and the second duct 228 could be aligned longitudinally.

The first coupler assembly 224 has pin members 230 extending inwardly from the first coupler assembly 224. The coupler ring apparatus 200 is affixed to the first coupler assembly 224. When affixing the coupler ring apparatus 200, the pin members 230 of the first coupler assembly 224 are received within the upper slot 216. The coupler ring 200 is then rotated such that the pin members 230 slide along the groove 220. When the pin members 230 are located at an end of the groove 220, the coupler ring 200 is held in place.

In matchcast assembly, it is important that the various ducts be aligned. In the system of the present invention, there is a second coupler assembly 226 affixed to a second duct 228. The second coupler assembly 226 and the second duct 228 must be positioned before pouring concrete therearound. In order to secure the second coupler assembly 226 to the first coupler assembly 224, the second coupler assembly 226 must also have pin members 230 extending inwardly therefrom. The second coupler assembly 226 is affixed to the coupler ring 200 in the same manner as was the first coupler assembly 224. The second coupler assembly 226 is positioned over the coupler ring 200 so that the pin members 230 of the second coupler assembly 226 are aligned with the lower slots 218. When the pin members 230 are received in the lower slot 218, the second coupler assembly 226 is rotated such that the pin members 230 of the second coupler assembly 226 travel along the groove 222. When the pin members 230 of the second coupler assembly 226 are positioned on the end of the groove 222, the second coupler assembly 226 and second duct 228 are held in place. At this point, it is possible for workers to pour concrete around the second coupler assembly 226 and the second duct 228. After concrete is poured around the second coupler assembly 226 and the second duct 228, the concrete is allowed to set.

Figure 11:
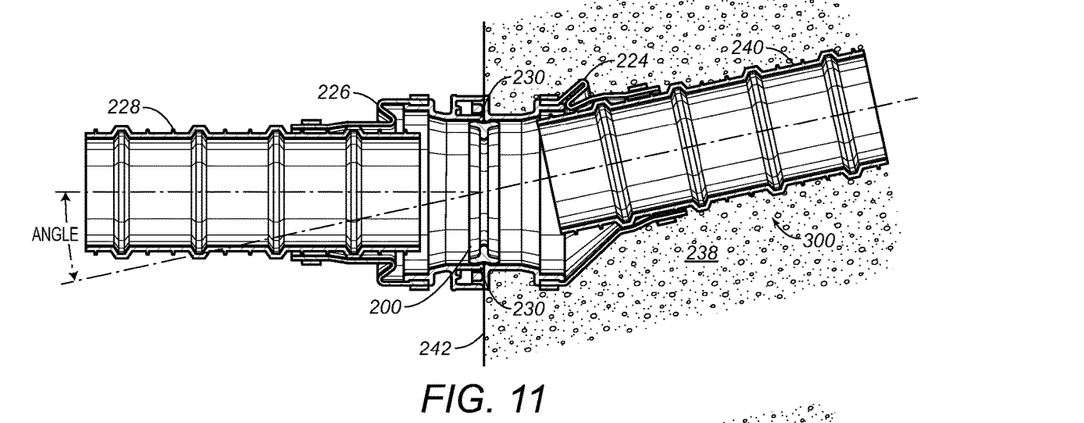
FIG. 11 shows a cross-sectional view of the coupler ring apparatus of the present invention installed in a matchcast assembly where the coupler ring apparatus fixes adjacent couplers together after each segment has been poured.

Referring to FIG. 11, there is shown the next step in the matchcast assembly process. Once the concrete is set, the second matchcast segment 232 must be removed from the first precast segment 238. The various segments must be removed so that they can be transported and reassembled at the site where construction is to take place.

The coupler ring 200 facilitates easy separation of the first precast segment 238 and the matchcast segment 232. Once the concrete of the matchcast segment 232 is set, the two segments 232 and 238 are pulled apart. The coupler ring apparatus 200 facilitates easy removal or easy separation of the two segments. This easy separation is accomplished by the relatively small depths of the various grooves 220 and 222. Because the grooves 220 and 222 have a small depth, the pin members 230 of either the first coupler assembly 224 or the second coupler assembly 226 can easily slide over the walls of the grooves. When the pin members 230 are able to slide over the grooves 220 and 222, the second coupler assembly 226 is easily separated from the coupler ring 200.

The second coupler assembly 226 additionally has a U-shaped channel 248 at an end thereof. The U-shaped channel opens towards the first precast segment 238. The second coupler 226 and the first coupler 224 are made of substantially flexible material. Even with the concrete hardened around the second coupler 226, the U-shaped channel 248 allows for the section of the second coupler assembly 226 adjacent the pin members 230 to be deflected over the grooves 220 and 222.

Still referring to FIG. 11, it can be seen how the precast segment 238 and the matchcast segment 232 are assembled together using the coupler ring apparatus 200 of the present invention. When the various tendons have been threaded through the first duct 240 and the second duct 228, the two segments 238 and 240 can be pressed together. As shown in FIG. 11, the first coupler assembly 224 has a annular face 246 which is flush with the outer surface 242 of the precast segment 238. Opposite the annular face 246 is the U-shaped channel 248 on the second coupler assembly 226. Within the U-shaped channel 248, there is shown the gasket 234. When the first precast segment 238 is positioned against the matchcast segment 232, the gasket 234 is pressed against the annular face 246 of the first coupler assembly 224. The gasket 234 thus forms a seal around the coupler ring 200. At the same time, the pin members 230 of the second coupler assembly 226 are pressed against the coupler ring apparatus 200. When the pin members 230 are pressed against the coupler ring 200, the walls of the channel deflect outwardly such that the pin members then again settle within the grooves 220 or 222 along the outer surface 202 of the coupler ring 200.

Figure 12:
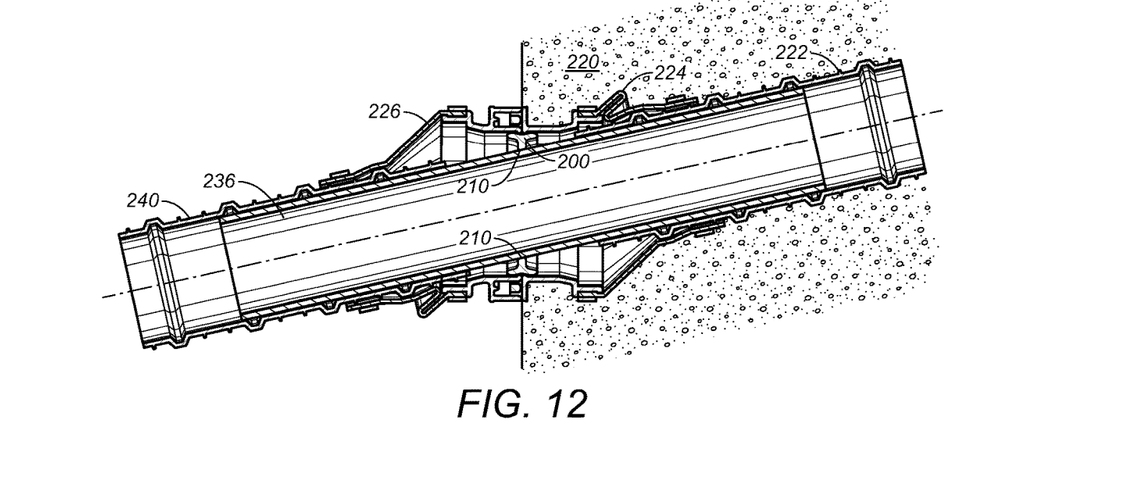
FIG. 12 shows a cross-sectional view of the coupler ring apparatus of the present invention installed in a matchcast assembly where a pipe or bladder has been installed within the ducts and couplers.

FIG. 12 shows a view of a pipe or bladder 236 extending interiorly of the first duct 240 and the second duct 228. Importantly, it can be seen in FIG. 12 that the curved surface of the inner annular member of the coupler ring 200 facilitates the place of the pipe or bladder 236 between the various couplers and ducts. The rounded surface of the inner annular member 210 allows the pipe and bladder to be positioned within the couplers 226 and 224 at an angle. The outer edges of the pipe or bladder 236 can pivot about the rounded surface of the inner annular member 210. Alternatively, the pipe or bladder 236 could be in a horizontal configuration. The angular configuration of the various ducts depends on the circumstances of the installation.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An article for connecting couplers during formation of matchcast concrete segments, the article comprising:
an annular member having an outer surface and a first edge and a second edge opposite said first edge, said annular member having a first slot formed in said outer surface, said first slot opening to said first edge and extending angularly inwardly therefrom, said annular member formed of a polymeric material, said annular member having a second slot formed in said outer surface in spaced relation to said first slot, said second slot opening to said second edge and extending angularly inwardly therefrom, said annular member having an inner surface opposite said outer surface thereof, said annular member having a single integrally formed tongue extending inwardly from said inner surface of said annular member, said tongue having a curved inner surface and a semicircular cross section, said annular member having a wall thickness, each of said first and second slots extending inwardly from said outer surface of said annular member for a depth approximately 20% of said wall thickness of said annular member.

2. The article of claim 1 said tongue extending around an entire inner diameter of said annular member.

3. The article of claim 2, said first slot being in generally parallel relation to said second slot.

4. The article of claim 2, said first slot comprising a plurality of slots formed in circumferentially spaced relation around said annular member, said second slot comprising a plurality of slots formed in circumferentially spaced relation around said annular member.

5. The article of claim 2, said first slot having a rectangular portion having a side opening to said first side of said annular member, said first slot having a groove extending angularly from an opposite side of said rectangular portion.

6. The article of claim 5, said second slot having a rectangular portion having a side opening to said second side of said annular member, said second slot having a groove extending angularly from an opposite side of said rectangular portion.

7. The article of claim 5, said groove extending for less than a circumference of said annular member.

* * * * *